United States Patent [19]

Harris

[11] Patent Number: 4,871,371
[45] Date of Patent: Oct. 3, 1989

[54] TINT COMPOSITIONS USEFUL FOR PROVIDING COLORATION TO AQUEOUS AND NON-AQUEOUS LIQUIDS

[75] Inventor: Jeffery R. Harris, Spartanburg, S.C.

[73] Assignee: Milliken Research Corporation, Spartanburg, S.C.

[21] Appl. No.: 261,205

[22] Filed: Oct. 24, 1988

[51] Int. Cl.$^4$ .............................................. D06P 5/13
[52] U.S. Cl. ......................................... 8/403; 8/580; 8/611; 534/729
[58] Field of Search ............................................. 8/403

[56] References Cited

U.S. PATENT DOCUMENTS

| | | | |
|---|---|---|---|
| 3,157,633 | 11/1964 | Kuhn | 8/403 |
| 3,819,324 | 6/1974 | Bind | 8/403 |
| 3,927,044 | 12/1975 | Foster et al. | 260/394 |
| 4,102,644 | 7/1978 | Hauser et al. | 8/403 |
| 4,113,721 | 9/1978 | Hauser et al. | 534/729 |
| 4,141,684 | 2/1979 | Kuhn | 8/403 |
| 4,144,028 | 3/1979 | Hauser et al. | 8/403 |
| 4,167,510 | 9/1979 | Brendle | 8/403 |
| 4,400,320 | 8/1983 | Keller et al. | 534/729 |
| 4,601,725 | 7/1986 | Keller et al. | 8/403 |

*Primary Examiner*—A. Lionel Clingman
*Attorney, Agent, or Firm*—Terry T. Moyer; H. William Petry

[57] ABSTRACT

A two component tint composition is provided which comprises as a first component, a colorant of the formula:

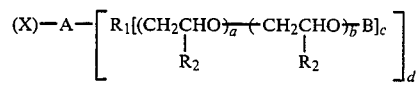

wherein
X is a polar group selected from sulfonic acids, sulfonic acid salts, sulfonamides, sulfonates, carboxylic acids, carboxylic acid salts, carboxylic acid amides, carboxylic aldehydes, carboxylic acid esters, ureas, thioureas, nitro groups, hydroxy groups, polyethers, and hydroxyalkylethers;
$R_1$ is selected from nitrogen, oxygen, sulfur, or a sulfur, or a sulfur-containing divalent linking group;
$R_2$ is hydrogen or a lower alkyl group;
a is an integer of from 2–10;
b is an integer of from 2–10;
c and d are each independently selected from one or two;
A is a chromophore selected from nitro, nitroso, monazo, diazo, diarylmethane, triarylmethane, acridine, methine, thiazole, indamine, oxazine, or anthraquinone; and
B is —H, -alkyl, or -alkyl carboxylate; and
as a second component a diluent selected from alkoxylated fatty acids and long chain alcohols, the weight ratio of diluent to colorant being from about 2.5 to about 5 parts diluent to 1 part colorant.

3 Claims, No Drawings

TINT COMPOSITIONS USEFUL FOR PROVIDING COLORATION TO AQUEOUS AND NON-AQUEOUS LIQUIDS

The present invention relates to polymeric tint compositions useful for providing coloration to aqueous and non-aqueous liquid systems. More particularly, the present invention relates to polymeric tint compositions for coloring liquids which are non-staining, water-washable, non-hazardous and biodegradable.

A wide range of colorants, typically consisting of dyes and pigments, are currently available through the industrial sector. Colorants are used in consumer goods such as aqueous and non-aqueous based products including cosmetics, inks, paper products, cleaning solutions, detergents, herbicide solutions, gasoline, motor oil products, antifreeze, paint, plastics, the textile industry, and the electronics industry (in the form of liquid crystal displays).

Currently, dyes are probably the colorants of choice for liquid systems since pigments typically lack the solubility requirements for use in liquid systems. Colorants are provided in liquid systems for a wide range of reasons such as visual appeal, observability (as contrasted to clear liquids) and to color code the identity of various clear liquids by using various corresponding colors.

Recently, however, many dyes have been declared to be hazardous chemicals and their use in consumer products has been either limited or eliminated entirely. Such environmental and safety concerns are forcing the color industry to produce new colorants which are safe in the workplace and non-harmful to the environment. The agriculture and forestry industries, in particular, have been compelled to refrain from using a number of dyes. The use of coloration in these industries, particularly, to provide color to herbicides and pesticides is desirable for color coding purposes and as a spray pattern indicator. Where such compositions are sprayed onto lawns or forests, however, they must be environmentally safe in order to protect wildlife and groundwaters.

Liquid compositions employed in the agriculture and forestry industries include both aqueous and non-aqueous liquid systems. Aqueous liquid systems currently employ a wide range of water-soluble dyes for color coding purposes. Non-aqueous or organic liquid systems such as diesel fuel, basal oil, ketones, aromatic solvents, and kerosene are currently colored by means of dyes which are soluble in organic solvents. Such organic solvent soluble dyes, however, are characterized, in such contemplated end use applications, by a number of disadvantages both for the user of such liquid systems as well as for the environment. Such dyes typically stain virtually anything with which they come into contact such as application equipment, worker's clothing, and skin itself. Furthermore, such dyes typically will not wash out with water. Such organic solvent soluble dyes are furthermore often toxic and they may be incompatible with one or more ingredients of the non-aqueous liquid system. Organic solvent soluble dyes typically are not biodegradable and, therefore, are often objectionable from an environmental standpoint.

The above described difficulties associated with providing coloration to both aqueous and non-aqueous liquid systems may be overcome by means of the present invention. Thus, by means of the present invention it may be possible to avoid or minimize permanent staining of the substrate to which the composition is intentionally applied, as well as to other areas that the composition may come into contact with such as worker's clothing, hands, application equipment, etc. Further, by means of the present invention colorants may be provided which are compatible with the components employed in non-aqueous liquid systems. The colorants furthermore are generally non-toxic, biodegradable and therefore non-harmful to the environment.

SUMMARY OF THE INVENTION

The tint compositions of the present invention are comprised of two essential components, a colorant component and a diluent solvent component. Such colorant components may be described as containing a chromophoric group and one or more polymeric groups. The chromophoric group of the colorant may be selected from the triphenylmethane type (TPM), diazo, diarylmethane, acridine, methine, thiazole, indamine, oxazine, or anthraquinone classes. The polymeric group of the colorant component is a mixed ethyleneoxy-propyleneoxy chain.

The second component of the tint composition is a diluent solvent (eliminating the need for water) such as an alkoxylated fatty acid or an alkoxylated long chain alcohol. Alkoxylates of fatty acids may consist of fatty acids such as sunflower oil, coconut oil, tallow, tall oil, as well as vegetable fatty acids. Alkoxylates of alcohols may consist of those alcohols having carbon units of C8–C20 including both linear and branched alcohols and the isomers thereof.

The ratio of weight of colorant to diluent solvent is typically 1 part tint to 2.5–5.0 parts diluent solvent. Less than 2.5 parts diluent results in unstable dispersions of the invention in hydrocarbons. Furthermore, in order to be cost competitive in the market and to prevent any rheological effects upon sprayable hydrocarbon mixtures, a maximum of only 4% of the tint composition of the invention is added to hydrocarbon solutions. The colorant, therefore, must be of sufficient yield and color strength, when diluted with 2.5–5.0 parts diluent, to provide adequate coloration in a hydrocarbon end use application when the tint composition of the invention is added at the 2%–4% level.

DESCRIPTION OF PREFERRED EMBODIMENTS

As mentioned above, the tint compositions of the present invention are comprised of essentially two components, a colorant component and an alkoxylated fatty acid or an alkoxylated long chain alcohol. The colorant component of the present invention falls into a broad category of colorants known as alkyleneoxy-substituted fugitive tints. Such categories of tints have been known for many years and were disclosed at an early stage, for instance in U.S. Pat. No. 3,157,633 to Kuhn assigned to Milliken Research Corporation (herein the Kuhn '633 patent). The Kuhn '633 patent describes tints designed essentially for the fugitive tinting of textile materials which contain a dyestuff radical (triaryl methane, diazo, and methine tints are mentioned) bonded through a nitrogen atom to one or more polyethyleneoxy groups.

In a subsequently issued patent also assigned to Milliken Research Corporation, namely U.S. Pat. No. 3,927,044 to Foster, et al. (herein the Foster Patent), certain alkaline stable fugitive tints are disclosed including ethyleneoxy-substituted triphenylmethane type chromophoric groups. Significantly up until this time and even in some later patents in this field, such as U.S. Pat. No. 4,102,644 Hauser, et al., assigned to Milliken Research Corporation (herein the Hauser Patent), water fugitivity was the ultimate goal and such fugitivity was generally achieved by providing ethyleneoxy chains on the chromophoric group.

However, not all textile finishing operations involve aqueous systems. Where non-aqueous systems are employed, it was not possible to remove the tints by means of such non-aqueous finishing treatments because the tints were water-soluble and not necessarily soluble in non-aqueous liquid systems. Thus, in a patent which issued in 1978, U.S. Pat. No. 4,113,721 to Hauser, assigned to Milliken Research Corporation (herein the Hauser '721 Patent), fugitive tints were disclosed which were fugitive with water as well as with non polar solvents. These tints were described as being substituted with ethyleneoxy- propyleneoxy polymer chains, ethyleneoxypropyleneoxy copolymers, block polymers or graft polymers, etc., wherein the ethyleneoxy- units comprised between about 40 and 60 mole percent of the chains with the propyleneoxy units being the remainder (see column 1, lines 54–60). While the colorants employed in the composition of the present invention are selected from the broad category of tints referred to in the above patents, the colorants of the present invention may be characterized by a rather special category of chromophoric groups, and their polymer chains in general have a relatively narrowly defined length and composition expressed in terms of a ratio of ethylene oxide to propylene oxide.

The colorant components employed, according to the present invention, may be characterized by the following formula:

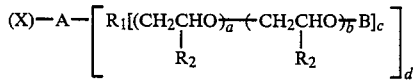

wherein

X is a polar group selected from sulfonic acids, sulfonic acid salts, sulfonamides, sulfonates, carboxylic acids, carboxylic acid salts, carboxylic acid amides, carboxaldehydes, carboxylic acid esters, ureas, thioureas, nitro groups, hydroxy groups, polyethers, and hydroxyalkylethers;

$R_1$ is selected from nitrogen, oxygen, sulfur, or a sulfur, or a sulfur-containing divalent linking group;

$R_2$ is hydrogen or a lower alkyl group;

a is an integer of from 2-10;

b is an integer of from 2-10;

c and d are each independently selected from one or two;

A is a chromophore selected from nitro, nitroso, monoazo, diazo, diarylmethane, triarylmethane, acridine, methine, thiazole, indamine, oxazine, or anthraquinone; and B is —H, -alkyl, or -alkyl carboxylate Because the colorant itself is an extremely viscous material having a relatively low solubility in hydrocarbon media, it is necessary to dissolve the colorant in a diluent solvent in order to establish compatibility in hydrocarbon media. These diluent solvents are the second component of the composition of the present invention. Diluents consisting of alkoxylated fatty acids and long chain alcohols are excellent solvents for the colorants and serve to lower the viscosity of the tints and improve processability of such colorants. Because such alkoxylated fatty acids and long chain alcohols are solvents for the polymeric colorants, concentrated solutions of colorants can be produced which are soluble in aqueous or organic media and dispersible in hydrocarbon media. With regard to the second component of the tint composition, as has been mentioned above, that component may be most broadly described as an alkoxylated fatty acid or long chain alcohol. Examples of fatty acids include coconut oil, tallow, tall oil, and sunflower oil. Examples of alkoxylated long chain alcohols include both linear and branched alcohols having carbon units of C8-C20 and all isomers thereof. The weight ratio of alkoxylated fatty acid to colorants is from about 2.5-5.0 parts diluent to 1 part colorant, preferably from about 3.5 to about 5.0 parts diluent in order to achieve adequate dispersibility in a hydrocarbon media.

The compositions of the present invention are found to be quite stable in a wide variety of solvent systems and are found to provide excellent spray pattern identification when the compositions are incorporated into sprayable solutions at the 2%–4% level. The compositions of the present invention are not only water dispersible but are also soluble in a wide variety of organic solvents, particularly aromatic and chlorinated solvents as well as dispersible in hydrocarbon solvent applications.

Thus, typically the tint compositions of the present invention may be dissolved or dispersed in aqueous solutions, combinations of basal oil and diesel fuel, and diesel fuel/herbicide or basal oil/herbicide mixtures. The tint compositions of the present invention may typically be added to the above combinations of hydrocarbon fuels, in amounts of from about 2%–4%, preferably about 3%, to form stable inverse-emulsions of adequate coloration. The tint compositions of the present invention are furthermore quite soluble in low molecular weight aromatic, chlorinated, and ketone solvents and they are soluble in aqueous media as well. By means of the tint compositions of the present invention, very bright indicator solutions can be produced which are quite useful for a variety of end use applications where the location of application of such compositions must be determinable. The tint compositions of the present invention may also be used or color coding applications, in particular, for the color coding of hydrocarbon fuels or other low molecular weight, organic and aqueous media h which are, for instance, frequently used in agricultural or lawn care operations.

The following examples are provided to illustrate the subject matter of the present invention; however, it is to be understood that the examples are for illustrative purposes only and are not to be construed as unduly limiting the scope of the present invention. Unless otherwise indicated (in the following examples and elsewhere in this specification) all parts and percentages are by weight.

EXAMPLE 1

Synthesis of N,N-bishydroxyethylpolyoxyethylene Aniline (I)

A tint intermediate (I) is prepared by bubbling 136 g of ethylene oxide into 190 g of N,N-dihydroxyethyl aniline in the presence of potassiumhydroxide catalyst following well known ethoxylation procedures. The mixture is allowed to react until a theoretical ratio of 1 mole of aniline to 5 moles of ethylene oxide is achieved. At this point, the ethylene oxide is followed by 303 g of propylene oxide and polymerized at the same temperature such that the overall ratio of the polymer composition is that of 1 mole aniline, 5 moles of ethylene oxide, and 5 moles of propylene oxide.

EXAMPLE 2

Synthesis of N,N-bishydroxyethylpolyoxyethylene Aniline (II)

A tint intermediate (II) is prepared by bubbling 680 g of ethylene oxide into 350 g of N,N-dihydroxyethyl aniline in the presence of potassium hydroxide catalyst following well known ethoxylation procedures. The mixture is allowed to react until a theoretical ratio of 1 mole of aniline to 10 moles of ethylene oxide is achieved. At this point, the ethylene oxide is followed by 1,125 g of propylene oxide and polymerized at the same temperature such that the overall ratio of the polymer composition is that of 1 mole aniline, 10 moles of ethylene oxide, and 10 moles of propylene oxide.

EXAMPLE 3

Synthesis of N,N-bishydroxyethylpolyoxyethylene Aniline (III)

A tint intermediate (III) is prepared by bubbling 97 g of ethylene oxide into 250 g of N,N-dihydroxyethyl aniline in the presence of potassium hydroxide catalyst following well known ethoxylation procedures. The mixture is allowed to react until a theoretical ratio of 1 mole of aniline to 3 moles of ethylene oxide is achieved. At this point, the ethylene oxide is followed by 904 g of propylene oxide and polymerized at the same temperature such that the overall ratio of the polymer composition is that of 1 mole aniline, 3 moles of ethylene oxide, and 7 moles of propylene oxide.

EXAMPLE 4

Synthesis of N,N-bishydroxyethylpolyoxyethylene Aniline (IV)

A tint intermediate (IV) is prepared by bubbling 195 g of ethylene oxide into 250 g of N,N-dihydroxyethyl aniline in the presence of potassium hydroxide catalyst following well known ethoxylation procedures. The mixture is allowed to react until a theoretical ratio of 1 mole of aniline to 4 moles of ethylene oxide is achieved. At this point, the ethylene oxide is followed by 303 g of propylene oxide and polymerized at the same temperature such that the overall ratio of the polymer composition is that of 1 mole aniline, 4 moles of ethylene oxide, and 6 moles of propylene oxide.

EXAMPLE 5

Synthesis of N,N-bishydroxyethylpolyoxyethylene Aniline (V)

A tint intermediate (V) is prepared by bubbling 655 g of ethylene oxide into 895 g of N,N-dihydroxyethyl aniline in the presence of potassium hydroxide catalyst following well known ethoxylation procedures. The mixture is allowed to react until a theoretical ratio of 1 mole of aniline to 5 moles of ethylene oxide is achieved. At this point, the ethylene oxide is followed by 303 g of propylene oxide and polymerized at the same temperature such that the overall ratio of the polymer composition is that of mole aniline, 5 moles of ethylene oxide, and 4 moles of propylene oxide.

EXAMPLE 6

Synthesis of N,N-bishydroxyethylpolyoxyethylene Aniline (VI)

A tint intermediate (VI) is prepared by bubbling 150 g of ethylene oxide into 300 g of N,N-dihydroxyethyl aniline in the presence of potassium hydroxide catalyst following well known ethoxylation procedures. The mixture is allowed to react until a theoretical ratio of 1 mole of aniline to 4 moles of ethylene oxide is achieved. At this point, the ethylene oxide is followed by 303 g of propylene oxide and polymerized at the same temperature such that the overall ratio of the polymer composition is that of 1 mole aniline, 6 moles of ethylene oxide, and 4 moles of propylene oxide.

EXAMPLE 7

Synthesis of Para-formyl-N,N-polyoxyethylene Aniline Diacetate (VII)

The intermediate (I) is acetylated and formulated according to those conditions outlined in U.S. Pat. No. 4,596,454. The intermediate collected contains 20% nonvolatiles by weight of total composition.

EXAMPLE 8

Synthesis of a Triphenyl Methane Tint (VIII)

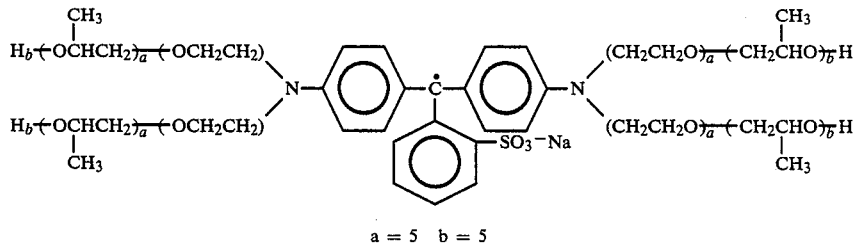

a = 5  b = 5

A mixture of the intermediate I (150 g), ortho-formyl benzene sulfonic acid (14,4 g), sulfuric acid 98% (5.3 g), urea (2.6 g) and water (30 g) is heated for 3 hours at 95° C. in a flask fitted with stirrer, thermometer, and condenser. At the end of 3 hours, the reaction mixture is oxidized by traditional methods to a dark blue color. The pH of the tint is neutralized with a 50% solution of sodium hydroxide. The neutralized tint is dispersed in 100 g of water and added to a separatory funnel where the tint is extracted from the aqueous salt layer with 300 g of methylene chloride. The tint is dried on a rotary evaporator to a viscous liquid.

EXAMPLE 9

Synthesis of a Triphenyl Methane Tint (IX)

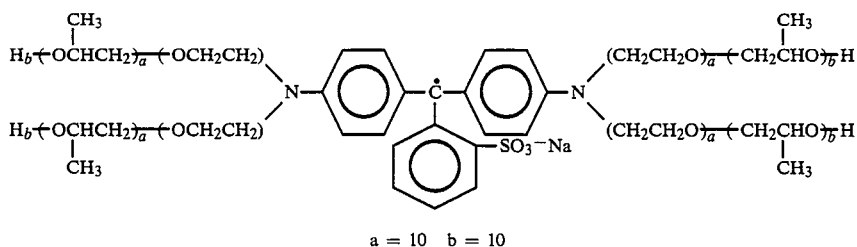

a = 10   b = 10

A mixture of the intermediate II (150 g), ortho-formyl benzene sulfonic acid (24.7 g), sulfuric acid 98% (9.3 g), urea (4.6 g) and water (30 g) is heated for 3 hours at 95° C. in a flask fitted with stirrer, thermometer, and condenser. At the end of 3 hours, the reaction mixture is oxidized by traditional methods to a dark blue color. The pH of the tint is neutralized with a 50% solution of sodium hydroxide. The neutralized tint is dispersed in 100 g of water and added to a separatory funnel where the tint is extracted from the aqueous salt layer with 300 g of methylene chloride. The tint is dried on a rotary evaporator to a viscous liquid.

EXAMPLE 10

Synthesis of a Triphenyl Methane Tint (X)

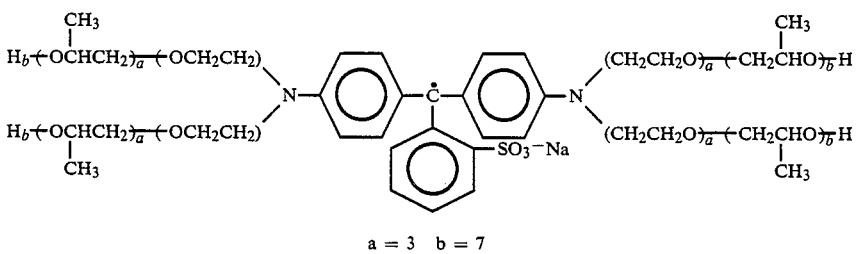

a = 3   b = 7

A mixture of the intermediate III (140 g), ortho-formyl benzene sulfonic acid (25.4 gl, sulfuric acid 98% (9.5 g), urea (4.6 g) and water (30 g) is heated for 3 hours at 95° C. in a flask fitted with stirrer, thermometer, and condenser. At the end of 3 hours, the reaction mixture is oxidized by traditional methods to a dark blue color. The pH of the tint is neutralized with a 50% solution of sodium hydroxide. The neutralized tint is dispersed in 100 g of water and added to a separatory funnel where the tint is extracted from the aqueous salt layer with 300 g of methylene chloride. The tint is dried on a rotary evaporator to a viscous liquid.

EXAMPLE 11

Synthesis of a Triphenyl Methane Tint (XI)

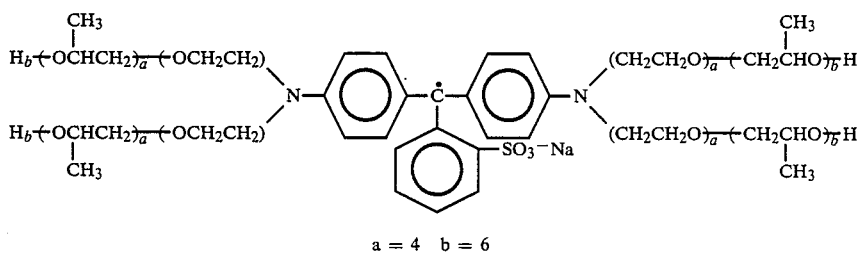

a = 4   b = 6

A mixture of the intermediate IV (150 g), ortho-formyl benzene sulfonic acid (27.9 g), sulfuric acid 98% (10.5 g), urea (5.2 g) and water (30 g) is heated for three hours at 95° C. in a flask fitted with stirrer, thermometer, and condenser. At the end of three hours, the reaction mixture is oxidized by traditional methods to a dark blue color. The pH of the tint is neutralized with a 50% solution of sodium hydroxide. The neutralized tint is dispersed in 100 g of water and added to a separatory funnel where the tint is extracted from the aqueous salt layer with 300 g of methylene chloride. The tint is dried on a rotary evaporator to a viscous liquid.

EXAMPLE 12

Synthesis of a Triphenyl Methane Tint (XII)

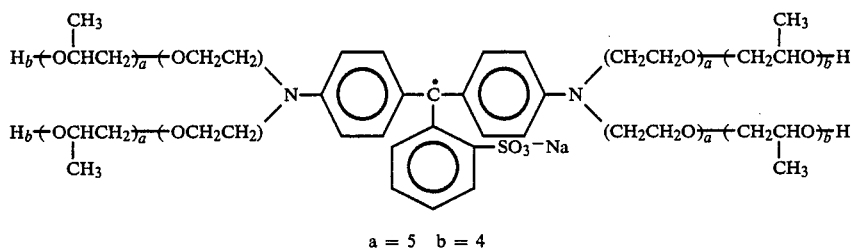

a = 5   b = 4

A mixture of the intermediate V (150 g), ortho-formyl benzene sulfonic acid (18.4 g), sulfuric acid 98% (6.9 g), urea (3.5 g) and water (30 g) is heated for three hours at 95° C. in a flask fitted with stirrer, thermometer, and condenser. At the end of three hours, the reaction mixture is oxidized by traditional methods to a dark blue color. The pH of the tint is neutralized with a 50% solution of sodium hydroxide. The neutralized tint is dispersed in 100 g of water and added to a separatory funnel where the tint is extracted from the aqueous salt layer with 300 g of methylene chloride. The tint is dried on a rotary evaporator to a viscous liquid.

EXAMPLE 13

Synthesis of a Triphenyl Methane Tint (XIII)

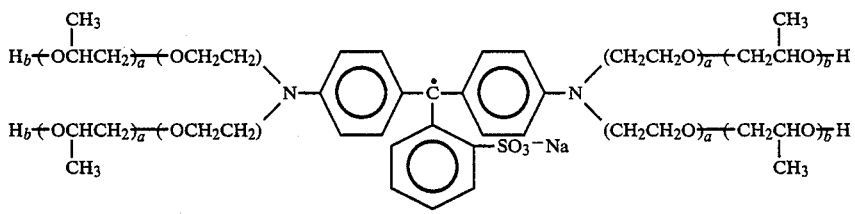

a = 6   b = 4

A mixture of the intermediate VI (140 g), ortho-formyl benzene sulfonic acid (23.6 g), sulfuric acid 98% (8.9 g), urea (4.4 g) and water (35 g) is heated for three hours at 95° C. in a flask fitted with stirrer, thermometer, and condenser. At the end of three hours, the reaction mixture is oxidized by traditional methods to a deep blue color. The pH of the tint is neutralized with a 50% solution of sodium hydroxide. The neutralized tint is dispersed in 80 g of water and added to a separatory funnel where the tint is extracted from the aqueous salt layer with 250 g of methylene chloride. The tint is dried on a rotary evaporator to a viscous liquid.

EXAMPLE 14

Synthesis of a Diazo Tint (XIV)

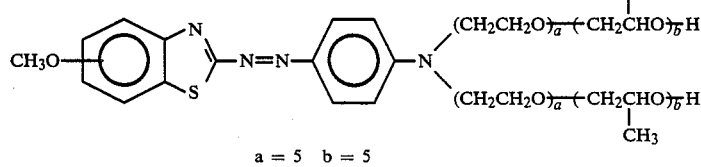

a = 5   b = 5

Nitrosylsulfuric acid (33.5 g) is added to a flask fitted with cooling and agitation capabilities. After cooling to below 5° C., 2-amino-6-methoxybenzothiazole (18 g) is added slowly. During the addition, the temperature is not allowed to rise above 5° C. A total of two grams of concentrated sulfuric acid is also added to decrease the viscosity of the mixture.

At the end of three hours, I (61.8 g) is dissolved in water (40 g) and charged to a vessel with cooling capacity and agitation capability. The mixture is cooled to 0°-5° C., whereupon the diazonium salt of 2-amino-6-methoxybenzothiazole is added over a 30 minute period. The mixture is subsequently allowed to couple for two hours at a temperature of 5° C. or below. The pH is adjusted to pH 7 with 50% caustic whereupon the dark red tint is dispersed in water (100 g) and added to a separatory funnel. Methylene chloride (300 g) is added to extract the tint from the aqueous salt layer. Upon collection the deep red tint is dried on a rotary evaporator.

EXAMPLE 15

Synthesis of a Diazo Tint (XV)

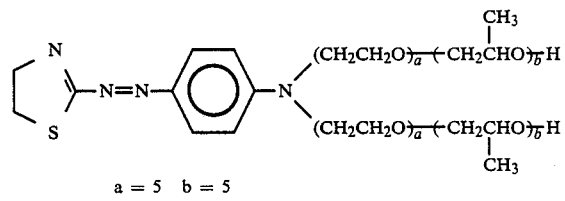

a = 5   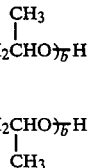b = 5

Nitrosylsulfuric acid (33.3 g) is added to a flask fitted with cooling and agitation capabilities. After cooling to below 5° C., 2-aminothiazole (10 g) is added slowly. During the addition the temperature is not allowed to rise above 5° C. A total of two grams of concentrated sulfuric acid is also added to decrease the viscosity of the mixture.

At the end of three hours, I (59.9 g) is dissolved in water (40 g) and charged to a vessel with cooling capacity and agitation capability. The mixture is then cooled to 0°–5° C., whereupon the diazonium salt of 2-aminothiazole is added over a 30 minute period. The mixture is subsequently allowed to couple for three to two hours at a temperature of 5° C. or below. The pH is then adjusted to pH 7 with 50% caustic. The dark orange tint is dispersed in water (100 g) and added to a separatory funnel. Methylene chloride is added to extract the tint from the aqueous salt layer. Upon collection the tint is dried on a rotary evaporator.

EXAMPLE 16

Synthesis of a Hemicyanine Tint (XVI)

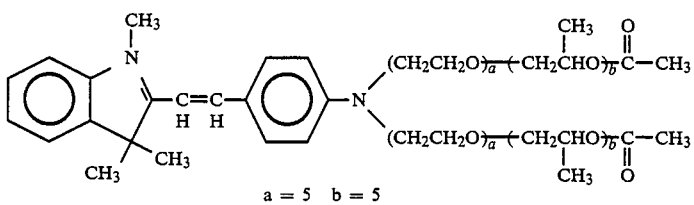

Fishers base (26.2) is condensed with VII (100 g) at 85° C. using acetic acid (5 g) as the catalyst. Maximum color yield is reached after three hours, at which time, vacuum is applied to remove all volatile components. The deep red colorant is collected as a viscous liquid.

EXAMPLE 17

Synthesis of a Methine Tint (XVII)

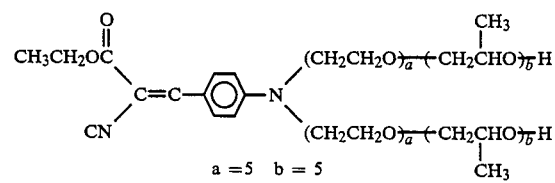

Ethyl cyano acetate (19.6 g) is condensed with VII (114.5 g) for two hours at 85° C. using morpholine (1 g) as catalyst. Maximum color yield is reached in four hours, at which time, vacuum is applied to remove all volatile components. The deep yellow tint is collected as a viscous liquid.

EXAMPLE 18

Synthesis of a Diazo Tint (XVIII)

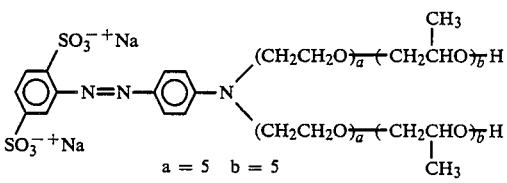

Aniline-2-5-disulfonic acid (31.9 g) is dispersed in water (160 g) whereupon 2.5 equivalents of 37% hydrochloric acid is added (31.30 g). The mixture is cooled below 5° C. where a concentrated aqueous solution of sodium nitrite (8.98 g) is added slowly. The mixture is checked for excess nitrite after 30 minutes with potassium iodide-starch test paper. If the test is negative, sodium nitrite is added in 0.5 g increments until the test for excess nitrite is positive. The reaction is allowed to continue for three hours.

At the end of three hours, I (78.2 g) is dissolved in water (40 g) and charged to a vessel with cooling capacity and agitation capability. The mixture is then cooled to 0°–5° C. where the diazonium salt of aniline-2-5-disulfonic acid is added over a 30 minute period. The mixture is subsequently allowed to couple for 2 hours at a temperature of 5° C. or below. The pH is then adjusted to pH 7 with 50% caustic and water is removed from the dark yellow tint by rotary evaporator. The tint is separated from any salts by dissolving the tint in methylene chloride and filtering through a fine sintered glass filter. Upon collection the dark yellow tint is dried on a rotary evaporator.

EXAMPLE 19

Synthesis of a Diazo Tint (XIX)

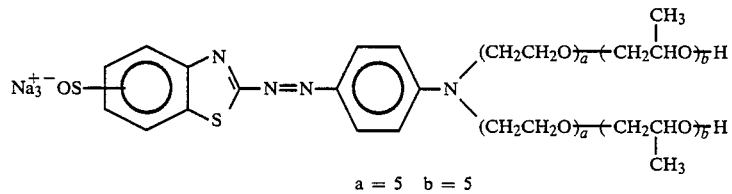

Nitrosylsulfuric acid (39.0 g) is added to a flask fitted with cooling and agitation capabilities. After cooling to below 5° C., 2-amino-6-benzothiazole sulfonic acid is added slowly. During the addition, the temperature is not allowed to rise above 5° C. A total of five grams of 85% phosphoric acid is also added to decrease the viscosity of the mixture.

The reaction is checked for excess nitrite after three hours. If the test is positive, water is added slowly in 1 gram increments to kill excess nitrite After the excess nitrite is dissipated, I (73.8 g) is dissolved in water (40 g) and charged to a vessel with cooling capacity and agitation capability. The mixture is cooled to 0°–5° C. where the diazonium salt of 2-amino-6-benzothiazole sulfonic acid is added over a 30 minute period. The mixture is subsequently allowed to couple for two hours at a temperature of 5° C. or below. The pH is adjusted to pH 7 with 50% caustic whereupon the dark red tint is dispersed in water (100 g) and added to a separatory funnel. Methylene chloride (300 g) is added to extract the tint from the aqueous salt layer. Upon collection the red tint is dried on a rotary evaporator.

EXAMPLE 20

Synthesis of a Diazo Tint (XX)

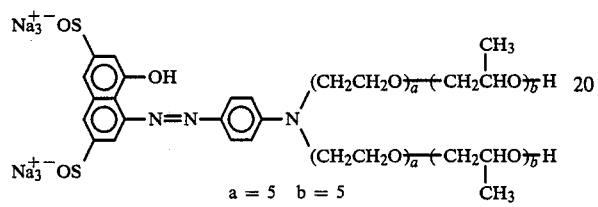

H-acid or 1-amino-8-naphtehol-3,6-disulfonic acid (30.0 g) is dispersed in water (50 g) whereupon 2.5 equivalents of 37% hydrochloric acid is added (20.1 g). The mixture is cooled below 5° C. where a concentrated, aqueous solution of sodium nitrite (5.8 g) is slowly added. The mixture is checked for excess nitrite after 30 minutes with potassium iodide-starch test paper. If the test is negative, sodium nitrite is added in 0.5 g increments until the test for excess nitrite is positive. The reaction is allowed to continue for one hour.

At the end of one hour, I (51.2 g) is dissolved in water (25 g) and charged to a vessel with cooling capacity and agitation capability. The mixture is then cooled to 0°–5° C. where the diazo product is added over a 30 minute period. During the coupling process, the pH of mixture is maintained at a pH range of between 3.8–4.2. This is accomplished with a concentrated solution of sodium acetate. The mixture is subsequently allowed to couple for 2 hours at a temperature of 5° C. or below. The pH is then adjusted to pH 8 with 50% caustic whereupon water is removed from the dark red tint by rotary evaporator. The tint is removed from any salts by dissolving the tint in methylene chloride and filtering through a fine sintered glass filter. Upon collection the tint is dried on a rotary evaporator.

EXAMPLE 21

Synthesis of a Diazo Tint (XXI)

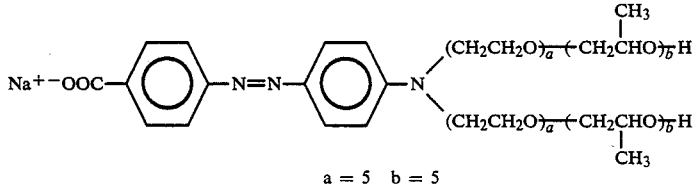

Para-amino benzoic acid (31.9 g) is dispersed in water (400 g) whereupon 2.5 equivalents of 37% hydrochloric acid is added (72.94 g). The mixture is cooled below 5° C. where a concentrated, aqueous solution of sodium nitrite (20.4 g) is slowly added. The mixture is checked for excess nitrite after 30 minutes with potassium iodide-starch test paper. If the test is negative, sodium nitrite is added in 0.5 g increments until the test for excess nitrite is positive. The reaction is allowed to continue for three hours.

At the end of 3 hours, I (72.9 g) is dissolved in water (40 g) and charged to a vessel with cooling capacity and agitation capability. The mixture is then cooled to 0<–5° C. where the diazo product is added over a 30 minute period. During the coupling process, the mixture is maintained in a pH range of 3.5–4.3. This is accomplished with a concentrated solution of sodium acetate. The mixture is subsequently allowed to couple for two hours at a temperature of 5° C. or below. The pH is then adjusted to pH 8 with 50% caustic whereupon water is removed from the dark yellow tint by rotary evaporator. The tint is removed from any salts by dissolving the tint in methylene chloride and filtering through a fine sintered glass filter. Upon collection the tint is dried on a rotary evaporator.

PREPARATION A

Tint-Emulsifier Compositions Containing a TPM

A tint/emulsifier composition is prepared by dissolving VIII (50 g) in 240 g ethoxylated coconut fatty acid (known as Trydet LA-5). The composition (Preparation A) is stable to both freeze-thaw cycles and 1 month heat stability at 140° F. The viscosity of solution is 180 CPS. The composition does not display any drift in color absorptivity nor precipitate during the test period.

Blends of Preparation A With Solvents

A. Preparation A (2 g) is added to Basal oil (50 g) and shaken. A stable blue dispersion forms which does not show any precipitate over a three day period. This mixture is easily washed from the hands with cold tap water. Preparation A was also tested for staining on multifiber fabric #43. The test fabric was soaked in a 2% solution of Preparation A and air dried for two hours, and soaked in tap water for 2 hours. Out of 13 swatches of fabric on the test strip, only wool and viscose were stained. The test fabric included samples of acetate, SEF, Arnel, bleached cotton, Creslan 61, Dacron 54, Dacron 64, Nylon 6,6, Orlon 75, spun silk, polypropylene, viscose, and wool, This is an impressive performance in regard to washability from various fabrics.

B. Preparation A (3 g) is added to a mixture of Basal oil (27 g) and diesel fuel (70 g) and shaken. This blue dispersion is stable for a period of 4 hours before precipitate is noticed. Once precipitated, the color can be reagitated and remain suspended for another 4 hours.

C. Preparation A (5 g) is dispersed in Garlon (95 g) which is a commercial herbicide/emulsifier composition. Excellent solution stability is obtained over a one week period. No precipitate is noticed during the test period.

D. Solutions of the Preparation A with numerous solvents at a 5 weight percent concentration are stable over five days of testing. These solvents include water, ketones such as acetone, MEK, MIBK, chlorinated solvents such as chloroform, dichloroethane, monochlorobenzene and aromatics such as benzene, toluene, and xylene.

PREPARATION B

Tint-Emulsifier Compositions Containing a TPM

A tint/emulsifier solution is prepared by dissolving IX (50 g) in 125 g ethoxylated coconut fatty acid (Trydet LA-5).

The composition (Preparation B) is stable to both freeze-thaw cycles and one month heat stability at 140° F. Due to IX being twice the molecular weight of VIII, half as much Trydet LA-5 is used to dilute the tint to the same color strength as Preparation A. The viscosity of the mixture is 300 CPS which is viscous and difficult to stir. The mixture requires long stir times to achieve a true solution. After solution is achieved, Preparation B does not display any drift in color absorptivity nor precipitate during the test period.

Blends of Preparation B With Solvents

A. Preparation B (2 g) is added to Basal oil (50 g) and shaken. A blue dispersion forms which is stable for 1 day before precipitate is noticed. This mixture is easily washed from the hands with cold tap water.

B. Preparation B (3 g) is added to a mixture of Basal oil (27 g) and diesel fuel (70 g) and shaken. This blue dispersion is stable for 30 minutes before precipitate is seen. C. Preparation B is dispersed in Garlon (95 which is a commercial herbicide/emulsifier composition. Stability is obtained for several days before signs of precipitation appear.

D. Solutions of Preparation B with numerous solvents at a 5 weight percent concentration are stable over five days of testing. These solvents include water, ketones such as acetone, MEK, MIBK, chlorinated solvents such as chloroform, dichloroethane, monochlorobenzene and aromatics such as benzene, toluene, and xylene.

PREPARATION C

Tint-Emulsifier Compositions Containing a TPM

A tint/emulsifier composition (Preparation C) is prepared by dissolving VIII (50 g) in 240 g ethoxylated lauryl alcohol (known as Emulsifier DG). The viscosity of the solution is 100 CPS. The composition is stable to both freeze-thaw cycles and one month heat stability at 140° F. The composition does not display any drift in color absorptivity nor precipitate during the test period.

Blends of Preparation C With Solvents

A. Preparation C (2 g) is added to Basal oil (50 g) and shaken. A stable blue dispersion forms which does not show any precipitate over a 1 month period. This mixture is easily washed from the hands with cold tap water.

Preparation C was also tested on multifiber fabric #43. The test fabric was soaked in 2% solution of Preparation C and air dried for two hours, and soaked in tap water for two hours. Out of 13 swatches of fabric on the test strip, only wool and Viscose were stained. The test fabric included samples of acetate, SEF, Arnel, bleached cotton, Creslan 61, Dacron 54, Dacron 64, Nylon 6,6, Orlon 75, spun silk, polypropylene, viscose, and wool. Preparation C is also readily washable from the hands with tap water.

B. Preparation C (3 g) is added to a mixture of Basal oil (27 g) and diesel fuel (70 g) and shaken. This blue dispersion is stable for a three day period before precipitate is noticed. Once precipitated the color can be reagitated and again suspended in the mixture.

C. Preparation C (5 g) is dispersed in Garlon (95 g) which is a commercial herbicide/emulsifier composition. Excellent solution stability is obtained over a one month period. No precipitate is seen during the test period.

D. Solutions of Preparation C with numerous solvents at a 5 weight percent concentration are stable over five days of testing. These solvents include water, ketones such as acetone, MEK, MIBK, chlorinated solvents such as chloroform, dichloroethane, monochlorobenzene and aromatics such as benzene, toluene, and xylene.

Tint-Emulsifier Compositions Containing X, XI, XII, XIII, and XIV

Test compositions of the remaining triphenylmethane tints are prepared by mixing Trydet LA-5 (225 g) and 50 g of X, XI, XII, and XIII, respectively. These compositions are stable to freeze-thaw testing and shelf stability at room temperature for one week. Color strength does not change during the test period. Two percent solutions of the above compositions in basal oil are also prepared for stability testing. Those Basal oil mixtures containing tints synthesized with III and IV display good stability during the three day test period. These samples did stain the hands much more so than Preparation A.

Those Basal oil mixtures containing tints synthesized with V and VI display precipitate after one day of testing. The samples did show hand washability comparable to Preparation A.

Summary of Compositions Containing Triphenylmethane Tints and Diluent Solvents Upon studying the stability of the Preparations containing triphenylmethane tints in various solvents, several conclusions are drawn. There is a viscosity limit at which the invention becomes impractical. The viscosity of the high molecular tint (IX) is such that solutions are difficult to prepare (ex. Preparation B) due to the long stir times necessary to achieve solutions. With higher molecular weights than IX, the achievement of solutions would be extremely difficult due to the high viscosity of the mixture. The viscosity of Preparations A and C are much more preferable in regard to processability requirements and end use applications (pouring and weighing).

As a general rule, the color yield decreases as molecular weight increases. The viscosity is also a function of the molecular weight and color strength of the tint produced. Since all the tints are diluted to the same color strength, a higher molecular weight intermediate decreases the color strength of the molecule, thereby reducing the amount of diluent solvent that can be added and increasing viscosity. For example, the molecular weight of VIII used in Preparation A is half the molecular weight of XIV used in Preparation B. Because of this fact, Preparation B has lower color yield and utilizes less diluent to reach the same color strength as Preparation A. The color strength of Preparation A is such that when added to hydrocarbon mixtures at between 2–4% levels, adequate spray patterns are discerned.

If the ratio of emulsifier to tint is below 2.5 parts emulsifier to 1 part tint, the composition then takes on the viscosity characteristics more like the tint itself, extremely viscous. Tints containing lower molecular weights, hence higher color yields and increased diluent content, such as tints VIII, X, XI, XII, and XIII, are preferable in terms of decreased viscosity and increased stability in hydrocarbon mixtures. The color yield of tints containing molecular weights greater than that of II is such that the ratio of emulsifier to tint would be below 2.5 parts emulsifier to 1 part tint.

Tint/emulsifier compositions containing increased amounts of propylene oxide in the tint intermediate (X and XI) display greater stability in basal oil comparable to Preparation A above. The tints did stain the hands to a greater extent than tints with increased ethylene oxide content (XII and XIII). Tint/emulsifier compositions containing the intermediates XII and XIII display less stability in basal oil as compared to Preparation A. These tint/emulsifier compositions did show comparable hand washability to Preparation A.

It is also apparent that the ethoxylated lauryl alcohol is a better diluent solvent in terms of tint/hydrocarbon compatibility. In each case, each tint/Emulsifier DG composition showed greater stability in basal oil and basal oil/hydrocarbon mixtures.

Tint-Emulsifier Compositions Containing Diazo and Methine Tints

PREPARATION D

A tint/emulsifier composition (Preparation D) is prepared by dissolving XIV (50 g) in 142 g ethoxylated lauryl alcohol (known as Emulsifier DG). The composition shows no signs of precipitation during a one week test period.

A. Preparation D (2 g) is added to Basal oil (50 g) and shaken. A stable reddish dispersion forms which does not show any precipitate over a 1 week period. Preparation D was also tested on multifiber fabric #43. The test fabric was soaked in a 2% solution of Preparation D and air dried for two hours, and soaked in tap water for two hours. Preparation D stained all of the fabric test swatches. Preparation D also stained the hands readily and did not wash with cold tap water.

B. Preparation D (3 g) is added to a mixture of basal oil (27 g) and diesel fuel (70 g) and shaken. This red dispersion is stable for one day before precipitate is noticed. Once precipitated the color can be reagitated and suspended in the mixture again.

C. Preparation D (5 g) is dispersed in Garlon (95 g) which is a commercial herbicide/emulsifier composition. Excellent solution stability is obtained over a one week period.

D. Solutions of Preparation D with numerous solvents at a 5 weight percent concentration are also stable over five days of testing. These solvents include water, ketones such as acetone, MEK, MIBK, chlorinated solvents such as chloroform, dichloroethane, monochlorobenzene and aromatics such as benzene, toluene, and xylene.

PREPARATION E

A tint/emulsifier composition (Preparation E) is prepared by dissolving XV (50 g) in 125 g ethoxylated lauryl alcohol (known as Emulsifier DG). The composition shows no signs of precipitation during a one week test period.

Blends of Preparation E With Solvents

A. Preparation E (2 g) is added to basal oil (50 g) and shaken. A stable orange dispersion forms which does not show any precipitate over a one week period. Preparation E was also tested on multifiber fabric #43. The test fabric was soaked in a 2% solution of Preparation E, air dried for two hours and soaked in tap water for two hours. Preparation E stained all of the test swatches. The tint readily stains the hands and is not washable with tap water.

B. Preparation E (3 g) is added to a mixture of basal oil (27 g) and diesel fuel (70 g) and shaken. This orange dispersion is stable for 1 day before precipitation is noticed.

C. Preparation E (5 g) is dispersed in Garlon (95 g) which is a commercial herbicide/emulsifier composition. Excellent solution stability is obtained over a 1 week period.

D. Solutions of Preparation E with numerous solvents at a 5 weight percent concentration are also stable over 5 days of testing. These solvents include water, ketones such as acetone, MEK, MIBK, chlorinated solvents such as chloroform, dichloroethane monochlorobenzene and aromatics such as benzene, toluene, and xylene.

PREPARATION F

A tint/emulsifier composition (Preparation F) is prepared by dissolving XVI (50 g) in 142 g ethoxylated lauryl alcohol (known as Emulsifier DG). The composition shows no signs of precipitation during a one week test period.

Blends of Preparation F With Solvents

A. Preparation F (2 g) is added to basal oil (50 g) and shaken. A stable reddish dispersion forms which does not show any precipitate over a one week period. Preparation F was also tested on multifiber fabric #43. The test fabric was soaked in a 2% solution of Preparation F and air dried for two hours and soaked in tap water for two hours. Preparation F stained all of the fabric test swatches. The composition also stained hands readily. The tint did not wash with cold tap water.

B. Preparation F (3 g) is added to a mixture of basal oil (27 g) and diesel fuel (70 g) and shaken. This red dispersion is stable for one day before precipitate is noticed. Once precipitated the color can be reagitated and suspended in the mixture again.

C. Preparation F (5 g) is dispersed in Garlon (95 g) which is a commercial herbicide/emulsifier composition. Excellent solution stability is obtained over a one week period.

D. Solutions of Preparation F with numerous solvents at a 5 weight percent concentration are also stable over five days of testing. These solvents include water, ketones such as acetone, MEK, MIBK, chlorinated solvents such as chloroform, dichloroethane, monochlorobenzene and aromatics such as benzene, toluene, and xylene.

PREPARATION G

A tint/emulsifier composition is prepared by dissolving XVII (50 g) in 25 g ethoxylated lauryl alcohol (known as Emulsifier DG). The composition shows no sign of precipitation during a one week test period.

Blends of Preparation G With Solvents

A. Preparation G (2 g) is added to basal oil (50 g) and shaken. A stable yellow dispersion forms which does not show any precipitate over a one week period. Preparation G was also tested on multifiber fabric #43. The test fabric was soaked in a 2% solution of Preparation G and air dried for two hours and soaked in tap water for two hours. Preparation G stained all of the test swatches. The tint readily stained the hands as well. The tint did not wash with cold tap water.

B. Preparation G (3 g) is added to a mixture of basal oil (27 g) and diesel fuel (70 g) and shaken. This yellow dispersion is stable for a one day period of testing.

C. Preparation G (5 g) is dispersed in Garlon (95 g) which is a commercial herbicide/emulsifier composition. Excellent solution stability is obtained over a one week period.

D. Solutions of Preparation G with numerous solvents at a 5 weight percent concentration are also stable over five days of testing. These solvents include water, ketones such as acetone, MEK, MIBK, chlorinated solvents such as chloroform, dichloroethane, monochlorobenzene and aromatics such as benzene, toluene, and xylene.

PREPARATION H

A tint/emulsifier Composition (preparation H) is prepared by dissolving XVIII (50 g) in 142 g ethoxylated lauryl alcohol (known as Emulsifier DG). The composition shows no precipitation during a one week test period.

Blends of Preparation H With Solvents

A. Preparation H (2 g) is added to basal oil (50 g) and shaken A yellow dispersion forms which does show precipitate after three days Preparation H was also tested on multifiber fabric #43. The test fabric was soaked in a 2% solution of Preparation H and air dried for two hours and soaked in tap water for two hours. Out of 13 swatches of fabric on the test strip, only wool and viscose were stained Preparation H is readily washed from the hands with tap water.

B. Preparation H (3 g) is added to a mixture of basal oil (27 g) and diesel fuel (70 g) and shaken. This yellow dispersion is stable for a 6 hour period before precipitate is noticed. Once precipitated the color can be reagitated and suspended in the mixture again.

C. Preparation H (5 g) is dispersed in Garlon (95 g) which is a commercial herbicide/emulsifier composition. Excellent solution stability is obtained over a 1 week period.

Solutions of Preparation H with numerous solvents at a 5 weight percent concentration are also stable over five days of testing. These solvents include water, ketones such as acetone, MEK, MIBK, chlorinated solvents such as chloroform, dichloroethane, monochlorobenzene and aromatics such as benzene, toluene, and xylene.

PREPARATION I

A tint/emulsifier composition (Preparation I) is prepared by dissolving XIX (50 g) in 125 g ethoxylated lauryl alcohol (known as Emulsifier DG). The composition does not show any precipitation during a one week test period.

Blends of Preparation I With Solvents

A. Preparation I (2 g) is added to basal oil (50 g) and shaken. A stable reddish dispersion forms which does not show any precipitate over a one week period. Preparation I was also tested on multifiber fabric #43. The test fabric was soaked in a 2% solution of Preparation I and air dried for two hours, and soaked in tap water for two hours. Out of 13 swatches on the test fabric, only wool and viscose are stained. The tint is also readily washable from the hands in cold tap water.

B. Preparation I (3 g) is added to a mixture of basal oil (27 g) and diesel fuel (70 g) and shaken. This red dispersion is stable for a six hour test period of testing.

C. Preparation I (5 g) is dispersed in Garlon (95 g) which is a commercial herbicide/emulsifier composition. Excellent solution stability is obtained over a one week period.

D. Solutions of Preparation I with numerous solvents at a 5 weight percent concentration are also stable over five days of testing. These solvents include water, ketones such as acetone, MEK, MIBK, chlorinated solvents such as chloroform, dichloroethane, monochlorobenzene and aromatics such as benzene, toluene, and xylene.

PREPARATION J

A tint/emulsifier composition (Preparation J) is prepared by dissolving XX (50 g) in 142 g ethoxylated lauryl alcohol (known as Emulsifier DG). The composition shows no precipitation during a one week test period.

Blends of Preparation J With Solvents

A. Preparation J (2 g) is added to basal oil (50 g) and shaken. A red dispersion forms which does show precipitate after three days. Preparation J was also tested on multifiber fabric #43. The test fabric was soaked in a 2% solution of Preparation H and air dried for two hours and soaked in tap water for two hours. Out of 13 swatches on the test strip, only wool and viscose were stained. The composition also washes readily from the hands in cold tap water.

B. Preparation J (3 g) is added to a mixture of basal oil (27 g) and diesel fuel (70 g) and shaken. This red dispersion is stable for a six hour period before precipitate is noticed. Once precipitated the color can be reagitated and suspended in the mixture again.

C. Preparation J (5 g) is dispersed in Garlon (95 g) which is a commercial herbicide/emulsifier composition. Excellent solution stability is obtained over a 1 week period.

D. Solutions of Preparation J with numerous solvents at a 5 weight percent concentration are also stable over five days of testing. These solvents include water, ketones such as acetone, MEK, MIBK, chlorinated solvents such as chloroform, dichloroethane, monochlorobenzene and aromatics such as benzene, toluene, and xylene.

PREPARATION K

A tint/emulsifier composition (Preparation K) is prepared by dissolving XIX (50 g) in 125 g ethoxylated lauryl alcohol (known as Emulsifier DG). The composition does not show any precipitation during a one week test period.

Blends of Preparation K With Solvents

A. Preparation K (2 g) is added to basal oil (50 g) and shaken. A stable yellow dispersion forms which does not show any precipitate over a one week period. Preparation K was also tested on multifiber fabric #43. The test fabric was soaked in a 2% solution of Preparation K and air dried for two hours, and soaked in tap water for two hours. Out of 13 on the test strip, only wool and viscose are stained. The tint is also readily washable from the hands in cold tap water.

B. Preparation K (3 g) is added to a mixture of basal oil (27 g) and diesel fuel (70 g) and shaken. This yellow dispersion is stable for a six hour test period of testing.

C. Preparation K (5 g) is dispersed in Garlon (95 g) which is a commercial herbicide/emulsifier composition. Excellent solution stability is obtained over a one week period.

D Solutions of Preparation K with numerous solvents at a 5 weight percent concentration are also stable over five days of testing. These solvents include water, ketones such as acetone, MEK, MIBK, chlorinated solvents such as chloroform, dichloroethane, monochlorobenzene and aromatics such as benzene, toluene, and xylene.

Summary of Compositions Containing Methine and Diazo Tints

It is quite apparent from a stability standpoint that tints without polar groups, such as sulfonic acids and carboxylic acids, are more stable in the hydrocarbon mixtures (ex. 30% basal oil/70% diesel). However, those tints without the sulfonic acid or carboxylic acid groups stain clothing and hands very badly. Tints with the polar groups display good stability in most of the examples presented herein and have excellent washability. In examples where temporary stability was demonstrated, the tint mixtures could also be reagitated and suspended for longer periods of time. This property makes the tints useful in the end use applications where the mixtures are constantly shaken.

Tints with polar groups, such as sulfonic acids, in general, provide a balance of properties which gives the invention its uniqueness. The tints are water washable and still dispersible in hydrocarbon solvents for end use applications. The tints can also be utilized in other solvents since they are soluble in a wide range of solvents, water and organics.

Field Application of the Invention

Field trial applications were performed with the standard 3 gallon backpack sprayers used in the tree farming industry.

Six ounces of Preparation C was dispersed in 3 gallons of basal oil in the backpack. The backpack was shaken gently to mix the colorant and hydrocarbon solvent. This mixture was then sprayed on the basal or bark portion of hardwood and pine trees and along the surrounding turf.

The effects of adding the colorant to the basal oil were dramatic. The colorant designated the spot where the mixture was sprayed on the bark as well as on surrounding turf. The identification of the spray location or pattern was clearly discernible with the use of the colorant as opposed to the basal oil alone. The control sample of basal oil was extremely difficult to see on the various bark and turf backgrounds. The use of colorant greatly enhanced the controlled application of a sprayable solution by clearly identifying the spray pattern.

I claim:

1. A two component tint composition which comprises as a first component, a colorant of the formula:

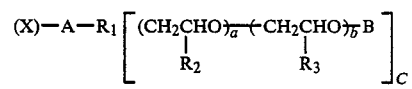

wherein

X is a polar group selected from sulfonic acids, sulfonic acid salts, sulfonamides, sulfonates, carboxylic acids, carboxylic acid salts, carboxylic acid amides, carboxylic aldehydes, carboxylic acid esters, ureas, thioureas, nitro groups, hydroxy groups, polyethers, and hydroxyalkylethers;

$R_1$ is selected from nitrogen, oxygen, or sulfur;

$R_2$ is hydrogen;

$R_3$ is a lower alkyl group;

a is an integer of from 2-10;

b is an integer of from 2-10;

c is one when $R_1$ is oxygen or sulphur and two when $R_1$ is nitrogen;

A is a chromophore selected from nitro, nitroso, monazo, diazo, diarylmethane, triarylmethane, acridine, methine, thiazole, indamine, oxazine, or anthraquinone; and B is —H, -alkyl, or -alkyl carboxylate; and as a second component a diluent selected from alkoxylated fatty acids and alkoxylated long chain alcohols, the weight ratio of diluent to colorant being from about 2.5 to about 5 parts diluent to 1 part colorant.

2. The composition of claim 1 wherein said alkoxylataed fatty acid is selected from coconut oil fatty acid, tallow fatty acid, tall oil fatty acid, and sunflower oil fatty acid.

3. The composition of claim 1 wherein said alkoxylated long chain alcohol is selected from linear and branched alcohols having from 8 to about 20 carbon atoms.

* * * * *